United States Patent
Speelman et al.

[19]

[11] Patent Number: 5,890,755
[45] Date of Patent: Apr. 6, 1999

[54] GLOVE BOX DOOR LATCH ASSEMBLY

[75] Inventors: Phillip Brian Speelman; Mark Antony Combs, both of Riverside, Ohio

[73] Assignee: General Motors Corporation, Detroit, Mich.

[21] Appl. No.: 741,425

[22] Filed: Oct. 24, 1996

[51] Int. Cl.⁶ .................................................. B60R 7/06
[52] U.S. Cl. ........................ 296/37.12; 296/37.8
[58] Field of Search ........................ 296/37.12, 37.8; 292/64, 97, 196, 240, 241, DIG. 23, DIG. 55

[56] References Cited

U.S. PATENT DOCUMENTS

| | | | |
|---|---|---|---|
| 1,965,672 | 7/1934 | Seitz . | |
| 2,750,217 | 6/1956 | Landholt | 292/97 |
| 3,113,797 | 12/1963 | Westerdale . | |
| 3,848,911 | 11/1974 | Watermann et al. | 292/216 |
| 4,223,940 | 9/1980 | Janz et al. | 296/37.12 |
| 4,557,512 | 12/1985 | Miyasaka et al. | 272/341.18 |
| 4,635,454 | 1/1987 | Brown | 70/139 |
| 4,781,407 | 11/1988 | Rauchhaus | 292/37 |
| 4,869,549 | 9/1989 | Londeck et al. | 296/224 |
| 4,886,311 | 12/1989 | Trube et al. | 296/37.12 |
| 4,893,854 | 1/1990 | Dietrich | 292/341.12 |
| 4,917,413 | 4/1990 | Jason et al. | 292/76 |
| 5,064,229 | 11/1991 | Hamada et al. | 292/216 |
| 5,438,853 | 8/1995 | Bartsch | 70/69 |

*Primary Examiner*—D. Glenn Dayoan
*Assistant Examiner*—Jason Morrow
*Attorney, Agent, or Firm*—Kathryn A. Marra

[57] ABSTRACT

A glove box door latch assembly includes a glove box door pivotally mounted on a vehicle for movement between an open position and a closed position. A striker is mounted on the vehicle. The striker includes a mounting portion for attachment to the vehicle and includes a laterally reduced neck portion extending outwardly from the mounting portion. The neck portion has a striker opening therethrough. A latch claw assembly is mounted on the glove box door and includes a latch claw for engaging the striker opening of the striker when the glove box door is in the closed portion. First and second opposing living hinges are disposed on the glove box and positioned on opposing sides of the latch claw. The living hinges guide the neck portion of the striker into the latch claw assembly such that the latch claw engages the striker opening when the glove box door is in the closed position.

15 Claims, 3 Drawing Sheets

GLOVE BOX DOOR LATCH ASSEMBLY

TECHNICAL FIELD

This invention relates to a glove box door latch assembly, and more particularly to an improved glove box door latch assembly which is self-aligning.

BACKGROUND OF THE INVENTION

It is well known in the prior art to provide a glove box door which closes an opening in the instrument panel. The glove box door is hingedly mounted to the instrument panel for pivotal movement between a closed position and an open position. A latch assembly is provided for holding the glove box door in the closed position.

Typically, the latch assembly includes a striker mounted to the instrument panel structure and a latch claw assembly mounted to the glove box door for trapping the striker when the glove box door is in the closed position and for releasing the striker to permit the glove box door to be moved to the open position. The typical striker is a bent metal wire which presents an U-shaped hook portion onto which a latch claw of the latch claw assembly may grab. The U-shaped hook portion of the striker extends laterally and presents a large U-shaped opening being about 15 mm wide and about 20 mm long. Thus, the latch claw may grip the striker at any lateral location along the U-shaped hook portion to account for differences in lateral cross-car variations between the latch claw assembly and the striker. However, this arrangement allows considerable variance in the lateral and longitudinal location of the glove box door in the closed position. Accordingly, the glove box door may not always fit flushly within the instrument panel opening when assembled. If a misalignment occurs during assembly, the misaligned glove box door must then be realigned by moving the striker, by twisting the glove box door or by removing and repositioning the glove box door. Considerable assembly time may be spent in realignment of the glove box door depending on the degree of misalignment.

SUMMARY OF THE INVENTION

The present invention offers advantages and alternatives over the prior art in providing a glove box door latch assembly that enables proper alignment of the glove box door during the assembly process. Advantageously, the glove box door latch assembly positively realigns the glove box door in the proper position every time the glove box door is moved to the closed position for fitting flushly within the instrument panel opening. Advantageously, the present invention reduces the possibility of misalignment of the glove box door during the assembly process such that realignment of the glove box door is not necessary. Also advantageously, the present invention provides a glove box door latch assembly which positively realigns the glove box door in the proper lateral and longitudinal positions each time the glove box door is moved to the closed position. Advantageously, the components of the glove box door latch assembly have a structure which enables alignment of the glove box door within a small range of tolerances each time it is moved to the closed position.

These advantages are accomplished in a preferred embodiment of the invention by providing a glove box door latch assembly including a glove box door pivotally mounted on the vehicle for movement between an open position and a closed position. A striker is mounted on the vehicle. The striker includes a mounting portion for attachment to the vehicle and includes a laterally reduced neck portion extending outwardly from the mounting portion. The neck portion has a striker opening therethrough. A latch claw assembly is mounted on the glove box door and includes a latch claw for engaging the striker opening of the striker when the glove box door is in the closed position. First and second opposing living hinges are disposed on the glove box and positioned on opposing sides of the latch claw. The living hinges guide the neck portion of the striker into the latch claw assembly such that the latch claw engages the striker opening when the glove box door is in the closed position. Preferably, the striker is a metal casting. Also preferably, the living hinges are integrally molded with the glove box door and made of a plastic material.

In accordance with other preferred features of the invention, the latch claw assembly includes a housing having opposing side walls each including an inclined stop surface thereon. The latch claw is rotatably mounted between the side walls and the opposing living hinges are each positioned between the latch claw and the respective opposing inclined stop surfaces of the side walls. Advantageously, the inclined stop surfaces limit outward lateral flexing of the living hinges when the striker is received between the living hinges when the glove box door is moved towards the closed position. Preferably, the neck portion of the striker has a lateral dimension sized for receipt between the living hinges and between the inclined surfaces of the side walls of the housing. Also preferably, the neck portion includes opposing tapered lateral sides for engaging the living hinges when the glove box door is moved to the closed condition. Engagement of the tapered lateral sides with the living hinges and engagement of the living hinges with the stop surfaces of the housing longitudinally and laterally aligns the glove box door when in the closed position.

In accordance with additional preferred aspects of the invention, the latch claw includes a claw portion for engaging the striker opening when the glove box door is in the closed position and the striker opening in the neck portion is sized for closely receiving the claw portion therein. Preferably, the striker opening is wedge-shaped and the claw portion of the latch claw has a complementary wedge shape for closely fitting within the striker opening when the glove box door is in the closed position.

The invention also preferably provides a method of assembling a glove box door to an instrument panel of a vehicle, including the steps of providing a glove box door including an inner panel and an outer panel; providing a pair of opposing living hinges disposed on the inner panel of the glove box door; mounting a latch claw assembly onto the outer panel of the glove box door, the latch claw assembly including a latch claw rotatably mounted between a pair of opposing inclined side walls for movement between a latched condition and an unlatched condition; positioning the living hinges between the latch claw and the respective inclined side walls of the latch claw assembly; providing a striker having a laterally reduced neck portion including a striker opening thereon sized for closely receiving the latch claw therein; attaching the striker to the latch claw assembly by engagement of the latch claw in the latched condition with the striker opening; pivotally mounting the glove box door on the instrument panel assembly for movement between a closed position and an open position; moving the glove box door to the closed position and flushly aligning the glove box door within an instrument panel opening to a properly aligned closed home position; and holding the glove box door in the closed home position while mounting the striker to the instrument panel.

BRIEF DESCRIPTION OF THE DRAWINGS

The present invention will now be described, by way of example only, with reference to the accompanying drawings, in which.

DESCRIPTION OF THE PREFERRED EMBODIMENT

Figure 1:
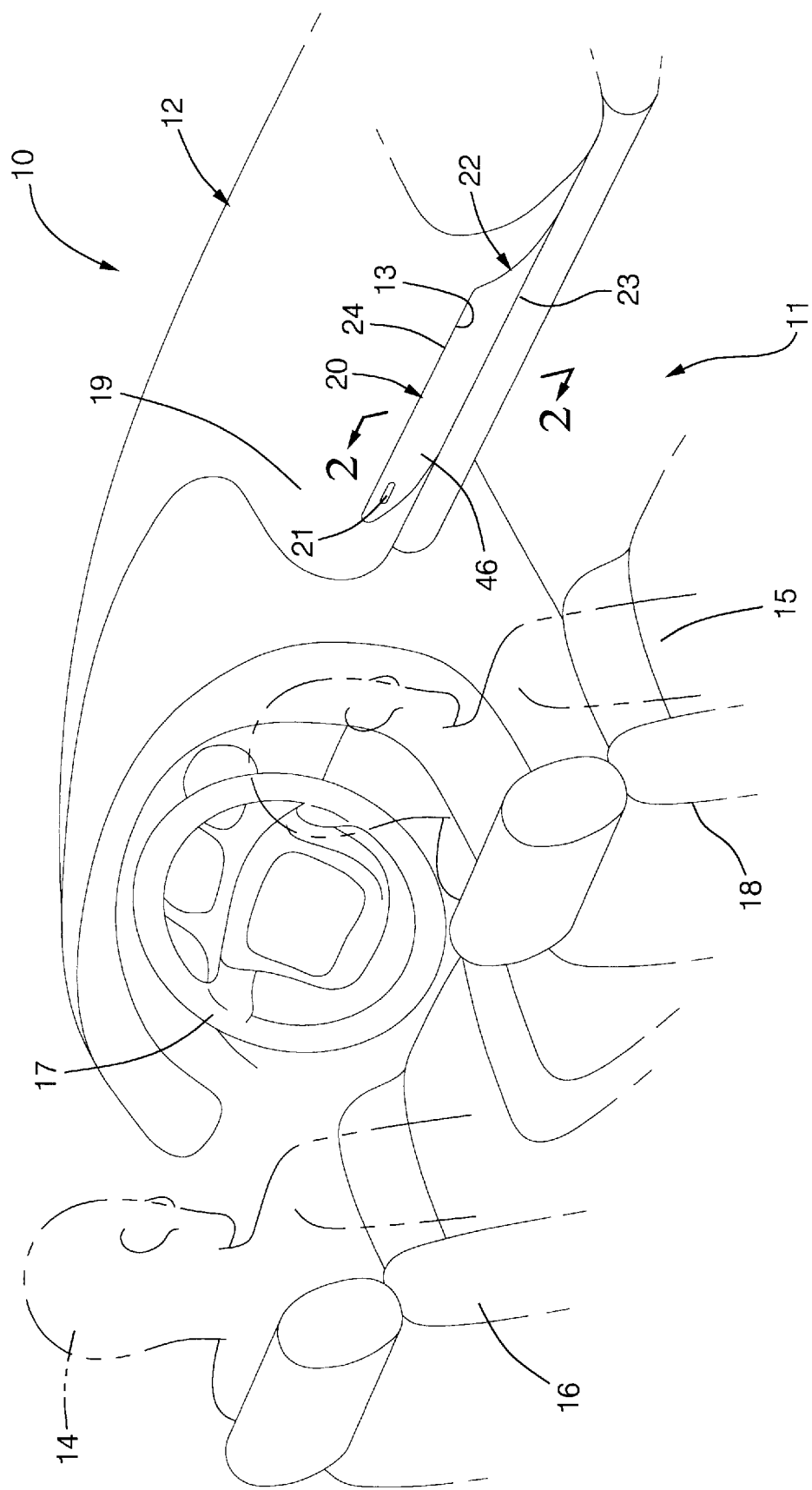
FIG. 1 is a perspective view of a vehicle interior including a glove box door mounted on an instrument panel.
Figure 2:
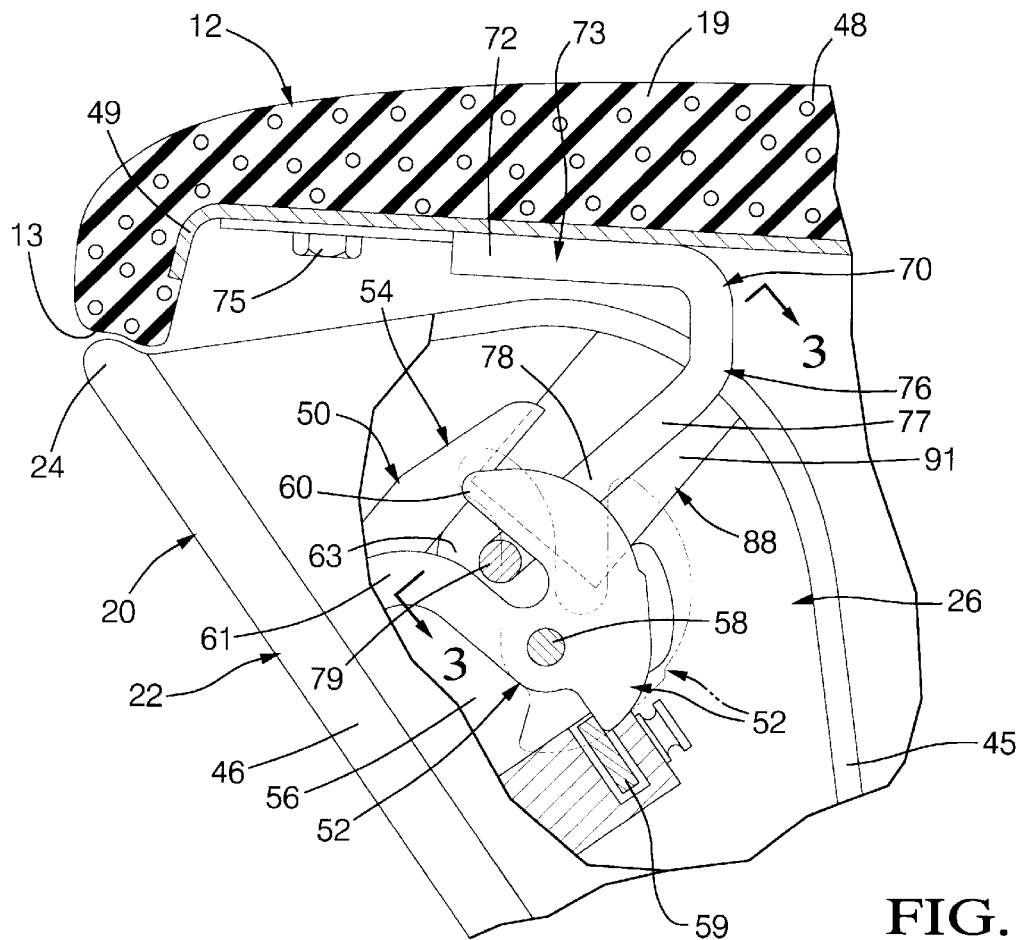
FIG. 2 is a side view taken along line 2—2 of FIG. 1 and showing a glove box door latch assembly in the latched condition with the glove box door partially-broken-away.

As best shown in FIG. 1, a vehicle 10 includes a vehicle interior 11 having an instrument panel assembly 12 located forward of a vehicle driver 14 and a vehicle passenger 15. The driver 14 is seated in a driver's seat 16 located rearward of a steering wheel 17 mounted on the instrument panel assembly 12. The passenger 15 is seated in a passenger side seat 18 generally rearward of a glove box assembly 20 mounted on the instrument panel assembly 12. The glove box assembly 20 is preferably located forward of the passenger 15 for accessibly storing small items therein. The glove box door 22 includes a handle 21 used for opening the glove box door 22. As best shown in FIG. 2, a top panel 19 of the instrument panel assembly 12 preferably includes a sturdy substrate layer 49 and an outer decorative foam layer 48 overlying the substrate layer 49.

Figure 3:
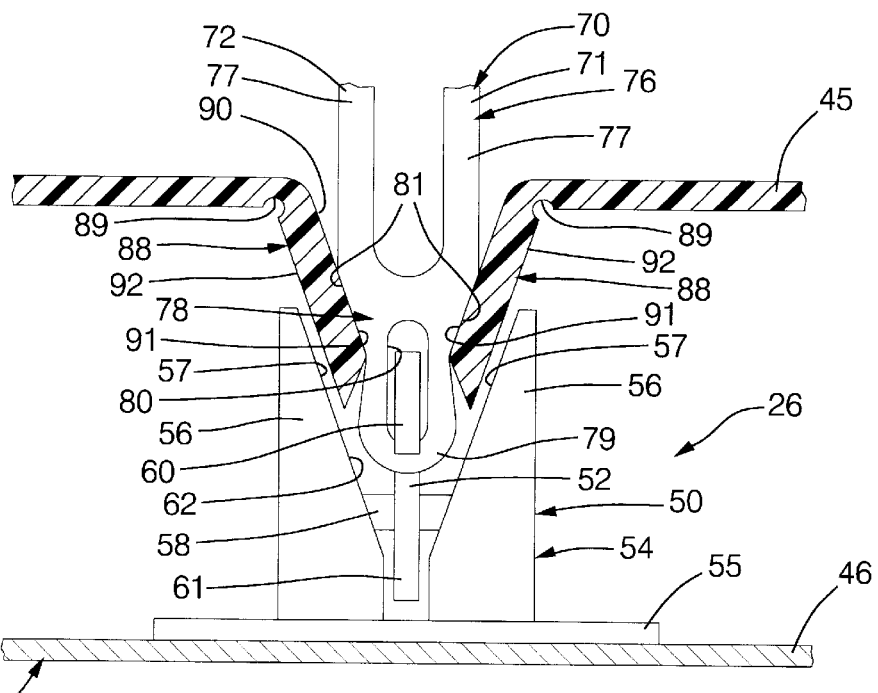
FIG. 3 is a view taken along line 3—3 of FIG. 2 and showing a front view of the glove box door latch assembly in the latched condition with the glove box door and striker partially broken away.

The glove box assembly 20 includes a glove box door 22 which fits flushly against and closes an instrument panel opening 13. As best shown in FIGS. 2 and 3, the glove box door 22 includes an inner panel 45 and an outer panel 46. The inner panel 45 and the outer panel 46 of the glove box door 22 are preferably separately molded of a plastic material and fastened together, preferably by screws. However, it will be appreciated that the inner and outer panels 45, 46 could also be integrally molded. The outer panel 46 preferably has an outer decorative covering that matches the outer foam layer 48 of the top panel 19 of the instrument panel assembly 12. It will be appreciated that the glove box assembly 20 includes the glove box door 22 and a glove box container (not shown) for holding the small items. It will be appreciated that the glove box door 22 and the container could be integrally molded together, or alternately that the glove box door 22 could be provided separate from the container.

The glove box door 22 preferably has a lower edge portion 23 which is hingedly mounted to the instrument panel assembly 12 for pivotal movement of the glove box door 22 between an open position and a closed position as shown in FIG. 1. The upper edge portion 24 of the glove box door 22 is releasably attached to the instrument panel assembly 12 by a glove box door latch assembly 26 which advantageously realigns the glove box door 22 to the proper longitudinal and lateral alignments each time the glove box door 22 is moved to the closed position, as described further hereinafter. The glove box door latch assembly 26 generally includes the component parts of a latch claw assembly 50, a striker 70, and a pair of spaced apart opposing living hinges 88, as described in detail below.

Figure 4:
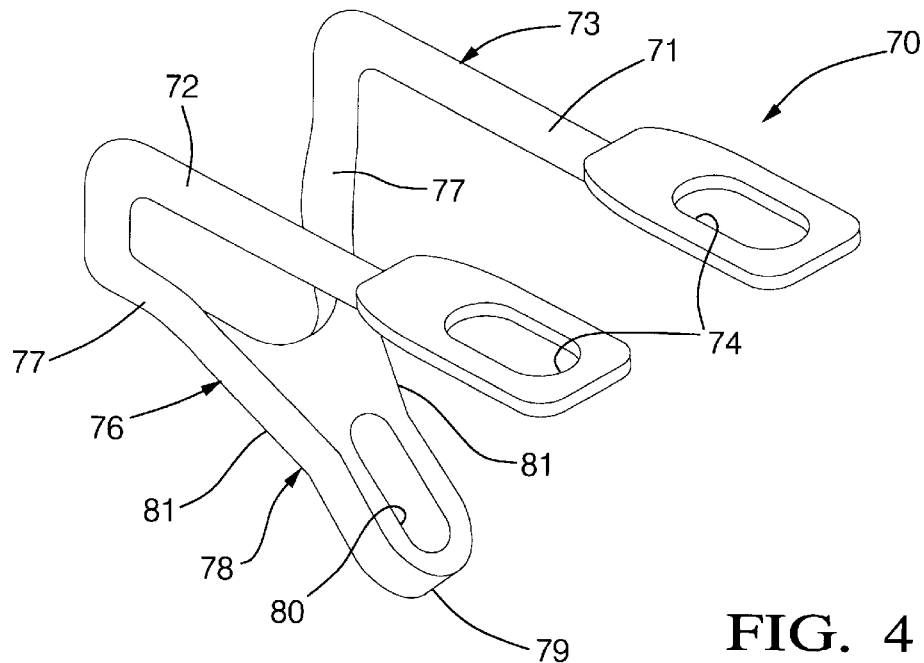
FIG. 4 is a perspective view of the striker of the glove box door latch assembly.

Referring to FIGS. 2–4, the striker 70 is preferably a molded metal casting. Advantageously, the dimensional tolerances and the shape of the striker 70 can be tightly controlled, unlike bent wire strikers of the prior art. It will further be appreciated that the striker 70 could alternately be molded of a sturdy plastic material to gain similar advantages of tight tolerance and shape control.

Referring to FIGS. 2 and 4, the striker 70 includes a first leg portion 71 and a second leg portion 72. The leg portions 71, 72 each include mounting portions 73 which are laterally spaced apart from each other and extend generally parallel to each other in the longitudinal direction. As best shown in FIGS. 2 and 4, each of the mounting portions 73 of the leg portions 71, 72 include a mounting aperture 74 at their free ends through which fasteners 75 are received for attaching the striker 70 to the substrate layer 49 of the top panel 19 of the instrument panel assembly 12, as described further hereinafter.

The striker 70 further includes a latching portion 76 extending downwardly away from the substrate layer 49 of the instrument panel assembly 12. The latching portion 76 includes converging arm portions 77 extending from each of the mounting portions 73. The converging arm portions 76 are spaced apart at their upper ends connected to the mounting portions 73 and converge laterally inward towards each other as they extend downwardly away from the mounting portions 73. The striker 70 further includes a neck portion 78 which generally extends outward and downward from an intersection of the converging arm portions 76. The neck portion 78 preferably has a generally decreasing lateral width from the upper end to the lower free end 79 of the striker 70. The neck portion 78 includes a striker opening 80 sized for closely receiving a latch claw 52 of the latch claw assembly 50 therein. The striker opening 80 has a lateral dimension of only about 5 mm and a vertical height of only about 10 mm for tight engagement with the latch claw assembly 50 to position the glove box door 22 in proper alignment. The neck portion 78 further includes opposing tapered lateral sides 81 located generally on either side of the striker opening 80. The neck portion 78 of the striker 70 has a lateral dimension only slightly larger than a lateral dimension of the latch claw 52 of the latch claw assembly 50 for closely receiving the latch claw 52 within the striker opening 80. The neck portion 78 has a lateral dimension substantially less than a lateral width of the mounting portions 73 of the striker 70. The neck portion 78 of the striker 70 has a decreased lateral dimension such that the neck portion 78 is sized for receipt between the living hinges 88 and sized for receipt within a throat portion 62 of the latch claw housing 54 of the latch claw assembly 50, as described further hereinafter.

The glove box door latch assembly 26 further includes the latch claw assembly 50. The latch claw assembly 50 includes a latch claw housing 54 having a base portion 55 mounted on the outer panel 46 of the glove box door 22. The latch claw housing 54 further includes opposing side walls 56 extending generally inward from the outer panel 46 and the base portion 55. The side walls 56 each include an inner inclined stop surface 57 facing the latch claw 52 which engages the striker 70. The side walls 56 having the inclined stop surfaces 57 are laterally spaced apart for closely receiving the living hinges 88 and the striker 70 therebetween. The inclined stop surfaces 57 converge laterally inward towards each other as they approach the base portion 55. The stop surfaces 57 each limit movement of the living hinges 88 of the glove box door latch assembly 26, as described further hereinafter. The side walls 56 and the stop surfaces 57 of the latch claw housing 54 generally form the throat portion 62 into which the neck portion 78 of the striker 70 is guided by the living hinges 88, as described further hereinafter.

The latch claw 52 is rotatably mounted on a mounting rod 58 which laterally extends between the side walls 56 of the latch claw housing 54 for movement between a latched condition shown in FIGS. 2 and 3 and an unlatched condition shown in phantom in FIG. 2. In the latched condition, the latch claw 52 engages the striker opening 80 of the neck portion 78 of the striker 70 to hold the glove box door 22 in the closed condition. The mounting rod 58 is preferably spring-loaded such that the latch claw 52 is spring-biased towards the unlatched condition. Upon engagement with the striker 70, the latch claw 52 is rotated to the latched condition and engages the striker 70 to keep the glove box door 22 in the closed condition. The latch claw housing 54 also preferably mounts a spring-loaded latch bar 59 which holds the latch claw 52 in the latched condition and which is laterally transversible for releasing the latch claw 52 and allowing the glove box door 22 to be moved to the open condition when the passenger 15 pulls the handle 21 on the glove box door 22, as described further hereinafter.

The latch claw 52 includes an upper claw portion 60, a lower claw portion 61 and a claw opening 63 formed between the upper and lower claw portions 60, 61. The upper claw portion 60 is sized for closely engaging and extending through the striker opening 80 of the striker 70 when the glove box door 22 is moved to the closed position to trap the neck portion 78 of the striker 70 within the claw opening 63 of the latch claw 52.

The glove box door latch assembly 26 further includes a pair of opposing living hinges 88 which are preferably integrally molded with the inner panel 45 of the glove box door 22. The living hinges 88 are each preferably made of a plastic material, such as acetal or polycarbonate which preferably has a high flexural modulus and a natural lubricity. The high flexural modulus is preferred such that the living hinges 88 have only a small degree of flex and generally maintain their intended position and the natural lubricity is preferred such that the living hinges 88 act as bearing surfaces for guiding the neck portion 78 of the striker 70. The living hinges 88 each project outwardly away from the inner panel 45 towards the outer panel 46 and laterally converge towards each other to form a tapered opening 90 for receiving the neck portion 78 of the striker 70 therein. The living hinges 88 each include a reduced hinge portion 89 about which the living hinges 88 may flex. In the assembled condition, the living hinges 88 are each normally positioned between respective stop surfaces 57 of the latch claw housing 54 and opposing sides of the latch claw 52 as best shown in FIG. 2. Lateral outward flexing of the living hinges 88 is limited by the inclined stop surfaces 57 of the latch claw housing 54. When the glove box door 22 is in the closed condition, the inner surfaces 91 of the living hinges 88 engage the striker 70 and the outer surfaces 92 engage the stop surfaces 57 of the latch claw housing 54. Preferably, the amount of flex allowed by the living hinges 88 is limited to about plus or minus 1 mm of movement towards the stop surfaces 57.

The glove box door latch assembly 26 is assembled as follows. The glove box door assembly 22 is provided with the latch claw assembly 50 mounted on the outer panel 46 of the glove box door 22 by its base portion 55. The latch claw 52 is provided as biased towards the unlatched condition by the mounting rod 58. The living hinges 88 are molded into or mounted on the inner panel 45 of the glove box door 22 and each of the living hinges 88 is positioned between the respective inclined stop surfaces 57 of the side walls 56 of the latch claw housing 54 and the latch claw 52. The glove box door 22 is hingedly attached by its lower edge portion 23 to the instrument panel assembly 12. Either before or after attachment of the glove box door 22 to the instrument panel assembly 12, the striker 70 is attached to the latch claw assembly 50 by pushing the neck portion 78 between the living hinges 88 until the upper claw portion 60 engages the striker opening 80 and the latch claw 52 is rotated to the latched condition. Thus, the striker 70 is temporarily held onto the glove box door 22 by engagement with the latch claw 52. Next, the glove box door 22 is moved to the closed position for closing the opening 13 in the instrument panel assembly 12. The glove box door 22 is aligned so that it fits flushly within the instrument panel opening 13 so that there are no gaps or offsets with the instrument panel assembly 12. This initially aligned position of the glove box door 22 in the closed position is called the home position. Next, the striker 70 is connected to the instrument panel assembly 12 by inserting fasteners 75 through each of the mounting apertures 74 on the mounting portions 73 of the leg portions 71, 72 and thereby attaching the striker 70 to the substrate layer 49 of the instrument panel assembly 12. Thus, the glove box door 22 is now in the closed position and is also aligned in the lateral and longitudinal direction by engagement of the striker 70 and latch claw 52 such that it is in the home position. Advantageously, since the neck portion 78 includes tapered lateral sides 81 for engaging the living hinges 88 and since the striker opening 80 is sized for closely receiving the latch claw 52 therein, there is minimal lateral and longitudinal positional variation of the glove box door 22 in the closed condition, preferably being less than about plus or minus 1 mm.

The glove box door latch assembly 26 functions as follows. When the glove box door 22 is moved towards the closed position, it is rotated about its lower edge portion 23 such that the upper edge portion 24 is moved in the longitudinal direction towards the top panel 19 of the instrument panel assembly 12 to close the instrument panel opening 13. Thus, the latch claw assembly 50 is accordingly moved in the longitudinal direction towards the striker 70 which is mounted on the substrate layer 49 of the top panel 19 of the instrument panel assembly 12. When the latch claw assembly 50 approaches the striker 70, the free end 79 on the neck portion 78 of the striker 70 is received between the living hinges 88 of the glove box door 22. Since the living hinges 88 are preferably molded from a smooth lubricious plastic and since the living hinges 88 form the tapered opening 90, the neck portion 78 of the striker 70 is received between the living hinges 88 and begins to engage and slide along the inner surfaces 91 of at least one of the living hinges 88. As the glove box door 22 is moved further towards the closed condition, the neck portion 78 of the striker 70 is guided into the throat portion 62 of the latch claw housing 54 by engagement with the living hinges 88. Lateral outward flexing of the living hinges 88 during engagement with the striker 70 is limited by the inclined stop surfaces 57 of the side walls 56 of the latch claw housing 54 which laterally surround the living hinges 88. Thus, glove box door 22 is guided back towards its initial home position as it engages the striker 70. Upon further movement of the glove box door 22 towards the closed position, the tapered lateral sides 81 of the neck portion 78 engage the living hinges 88 to center the striker 70 relative to the latch claw assembly 50 and to laterally and longitudinally position the glove box door 22.

Accordingly, the living hinges 88 act as guides and bearing surfaces to position the striker opening 80 of the neck portion 78 for receiving the upper claw portion 60 of the latch claw 52 therein. This is important because the striker opening 80 on the laterally reduced neck portion 78 is preferably laterally and longitudinally aligned within about plus or minus 1 mm of the home position for engagement with the latch claw 52 to hold the glove box door 22 in the closed condition. Thus, engagement of the neck portion 78 with the living hinges 88 moves the glove box door 22 into proper lateral and longitudinal alignment within a small tolerance of preferably about plus or minus 1 mm.

As the glove box door 22 is moved into proper alignment, the interaction of components of the glove box door latch assembly 26 simultaneously brings the glove box door 22 into proper longitudinal and lateral alignment back to the home position. To accomplish this, the neck portion 78 of the striker 70 is received between the living hinges 88 and the striker opening 80 is received within the claw opening 63 of the latch claw 52. Then, the downward force of the striker 70 on the lower claw portion 61 forces rotation of the latch claw 52 towards the latched condition. As the latch claw 52 rotates, the upper claw portion 60 extends through and engages the striker opening 80 of the neck portion 78 and latches the glove box door 22 into the closed position. It will be appreciated that the striker opening 80 on the neck portion 78 of the striker 70 is extremely small compared to striker openings of the prior art since it must fit between the living hinges 88 and between the side walls 56 of the latch claw housing 54. Thus, the glove box door 22 is guided back to its home position such that it is properly aligned in the lateral and longitudinal directions and flushly closes the instrument panel opening 13. Advantageously, it will be appreciated that the glove box door latch assembly 26 enables self alignment of the glove box door 22 each time it is moved to the closed position.

It will be appreciated that since the striker 80 includes the neck portion 78, since the neck portion 78 with the striker opening 80 thereon are guided into longitudinal and lateral alignment by the living hinges 88, and also since the movement of the living hinges 88 is limited by engagement with the stop surfaces 57 of the side walls 56 of the latch claw housing 54, the glove box door 22 is preferably realigned to within about plus or minus 1 mm of the home position each time the glove box door 22 is closed.

To open the glove box door 22, the passenger 15 or driver 14 simply pulls on the handle 21 which in turn translates the latch bar 59 in such a manner that it releases the latch claw 52 from the latched condition such that the latch claw 52 is free to rotate to the unlatched condition as assisted by the spring-biased mounting rod 58. The latch claw 52 rotates to the unlatched condition and the upper claw portion 60 moves out of engagement with the striker opening 80, while the neck portion 78 is pushed up out of the throat portion 62 of the latch claw housing 50 and also up out of the tapered opening 90 between the living hinges 88 such that the glove box door 22 is free to gravitate to the fully open position.

It will be understood that a person skilled in the art may make modifications to the preferred embodiment shown herein within the scope and intent of the claims. For example, although the living hinges 88 are shown as preferably being integrally molded with the inner panel 45 of the glove box door 22, it will further be appreciated that the living hinges 88 could also be molded separately and mounted to the glove box door 22. It will further be appreciated that the striker 70 could be mounted on the glove box door 22 and the latch assembly 50 and living hinges 88 disposed on the instrument panel assembly 12.

Figure 5:
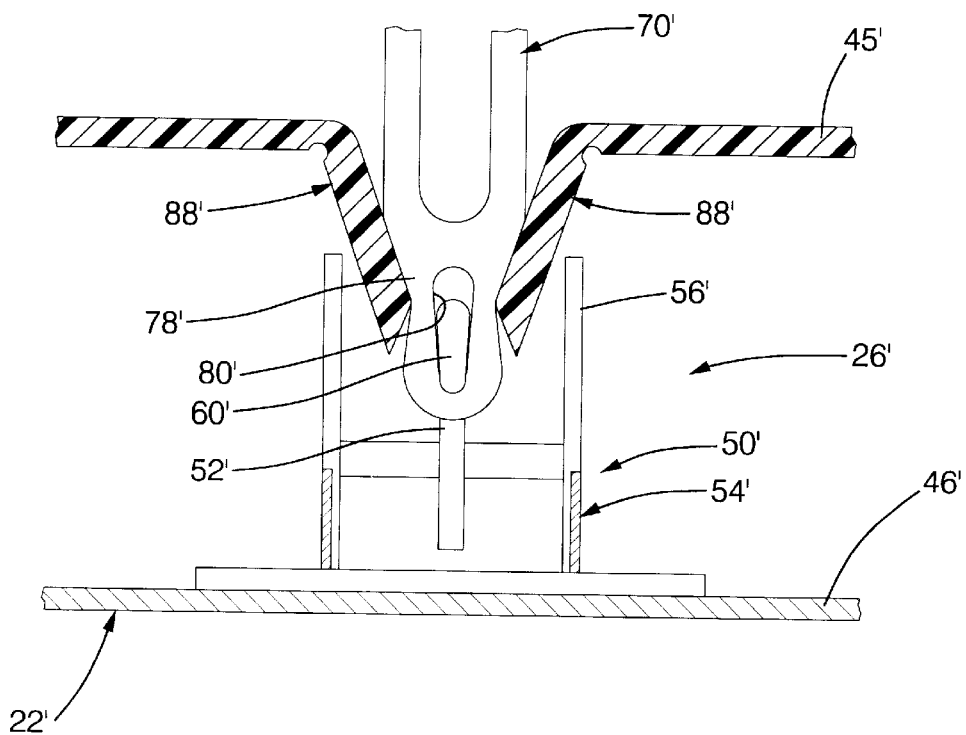
FIG. 5 is a view similar to FIG. 3, but showing an alternate embodiment of the invention.

FIG. 5 shows an alternate embodiment of the invention, which is similar to the embodiment shown in FIGS. 1–4, except that additional features are included which may permit even tighter alignment tolerances. Components similar to those in FIGS. 1–4 will be denoted with similar numerals followed by a prime and have a similar description, except for the differences noted below. A glove box door latch assembly 26' includes a striker 70' mounted to an instrument panel, a latch claw assembly 50' attached to an outer panel 46' of the glove box door 22', and a pair of living hinges 88' disposed on an inner panel 45' of the glove box door 22'. To tightly control the tolerances of the glove box door 22' in the closed position, the striker opening 80' on the neck portion 78' of the striker 70' is wedge-shaped. In addition, the upper claw portion 60' of the latch claw 52' of the latch claw assembly 50' has a wedge shape which is complementary to the wedge shape of the striker opening 80'. Thus, upon engagement of the latch claw 52' with the neck portion 78' of the striker 70' when the glove box door 22' is moved to the closed position, the wedge-shaped upper claw portion 60' on the latch claw 52' tightly engages the wedge-shaped striker opening 80' on the striker 70' such that lateral variations in the home position of the glove box door 22' are further minimized to preferably within about plus or minus 0.5 mm. It will further be appreciated that with this arrangement, the side walls 56' of the latch claw housing 54' preferably need not include inclined stop surfaces for limiting movement of the living hinges 88'. This allows for a larger variation in lateral tolerances when the striker 70' is initially guided into the latch claw assembly 50' by the living hinges 88'.

It will further be appreciated that the particular wedge-shape of the upper claw portion 60' of the latch claw 52' and of the striker opening 80' are merely exemplary and that any complementary wedge-type shapes may be used.

While the present invention has been described as carried out in specific embodiments thereof, it is not intended to be limited thereby but is intended to cover the invention broadly within the scope and spirit of the claims.

What is claimed is:

1. A glove box door latch assembly for use in a vehicle, the glove box door latch assembly comprising:

a glove box door pivotally mounted on the vehicle for movement between an open position and a closed position, the glove box door including an inner panel and an outer panel;

a striker mounted on the vehicle, the striker having a mounting portion for attachment to the vehicle and having a laterally reduced neck portion extending outwardly away from the mounting portion, the neck portion having a striker opening therethrough;

a latch claw assembly mounted on the outer panel of the glove box door, the latch claw assembly including a latch claw for engaging the striker opening of the striker when the glove box door is in the closed position; and first and second opposing living hinges disposed on the inner panel of the glove box door and positioned on opposing sides of the latch claw, the living hinges for guiding the neck portion of the striker into the latch claw assembly such that the latch claw engages the striker opening when the glove box door is in the closed position.

2. The glove box door latch assembly of claim 1 wherein the latch claw assembly includes a housing having opposing side walls each including an inclined stop surface thereon and having a mounting rod extending between the side walls, and wherein the latch claw is rotatably mounted for pivotal movement about the mounting rod extending between the side walls and wherein the opposing living hinges are each positioned between the latch claw and the respective opposing inclined stop surfaces of the side walls and wherein the inclined stop surfaces limit outward lateral flexing of the living hinges when the striker is received between the living hinges when the glove box door is moved towards the closed position.

3. The glove box door latch assembly of claim 2 wherein the stop surfaces limit outward lateral flexing of the living hinges to less than about plus or minus 1 mm.

4. The glove box door latch assembly of claim 2 wherein the neck portion of the striker has a lateral dimension sized for receipt between the living hinges and between the inclined surfaces of the side walls of the housing.

5. The glove box door latch assembly of claim 2 wherein the neck portion includes opposing tapered lateral sides for engaging the living hinges when the glove box door is moved to the closed condition whereby engagement of the tapered lateral sides with the living hinges and engagement of the living hinges with the stop surfaces of the housing longitudinally and laterally aligns the glove box door when in the closed position.

6. The glove box door latch assembly of claim 1 wherein the latch claw includes a claw portion for engaging the striker opening when the glove box door is in the closed position and wherein the striker opening in the neck portion is sized for closely receiving the claw portion therein.

7. The glove box door latch assembly of claim 6 wherein the striker opening is wedge-shaped and wherein the claw portion of the latch claw has a complementary wedge shape for closely fitting within the striker opening when the glove box door is in the closed position.

8. The glove box door latch assembly of claim 1 wherein the latch claw includes a claw portion for engaging the striker opening when the glove box door is in the closed position and wherein the striker opening on the neck portion has a lateral dimension sized for closely receiving the claw portion therein.

9. The glove box door latch assembly of claim 8 wherein the lateral dimension of the striker opening is less than about 2 mm greater than a lateral dimension of the claw portion.

10. The glove box door latch assembly of claim 1 wherein the neck portion includes opposing tapered lateral sides for engaging the living hinges when the glove box door is moved to the closed position whereby engagement of the tapered lateral sides with the living hinges provides proper longitudinal and lateral alignment of the glove box door in the closed position.

11. The glove box door latch assembly of claim 1 wherein the mounting portion of the striker includes first and second spaced apart opposing leg portions for connection to the vehicle and laterally converging arm portions extending from each of the first and second leg portions, wherein the laterally reduced neck portion of the striker extends from the intersection of the converging arm portions, the neck portion being sized for receipt between the living hinges and the striker opening being sized for closely receiving the latch claw therein.

12. The glove box door latch assembly of claim 7 wherein the living hinges are integrally formed with the inner panel of the glove box door.

13. The glove box door latch assembly of claim 1 wherein the living hinges are integrally formed with the glove box door and wherein the living hinges and the glove box door are made of a plastic material.

14. The glove box door latch assembly of claim 1 wherein the striker is a metal casting.

15. A method of assembling a glove box door to an instrument panel of a vehicle, the method comprising the steps of:

provide a glove box door including an inner panel and an outer panel;

providing a pair of opposing living hinges disposed on the inner panel of the glove box door;

mounting a latch claw assembly onto the outer panel of the glove box door, the latch claw assembly including a latch claw rotatably mounted between a pair of opposing inclined side walls for movement between a latched condition and an unlatched condition;

positioning the living hinges between the latch claw and the respective inclined side walls of the latch claw assembly;

providing a striker having a laterally reduced neck portion including a striker opening thereon sized for closely receiving the latch claw therein;

attaching the striker to the latch claw assembly by engagement of the latch claw in the latched condition with the striker opening;

pivotally mounting the glove box door on the instrument panel assembly for movement between a closed position and an open position;

moving the glove box door to the closed position and flushly aligning the glove box door within an instrument panel opening to a properly aligned closed home position; and holding the glove box door in the closed home position while mounting the striker to the instrument panel.

* * * * *